(12) United States Patent
Matov et al.

(10) Patent No.: US 8,381,030 B2
(45) Date of Patent: Feb. 19, 2013

(54) BUSINESS METHODS RETRY OPTIMIZATION

(75) Inventors: Peter Matov, Walldorf (DE); Krasimir Topchiyski, Walldorf (DE); Bistra Yakimova, Walldorf (DE); Vladimir Pavlov, Walldorf (DE)

(73) Assignee: SAP AG, Walldorf (DE)

( * ) Notice: Subject to any disclaimer, the term of this patent is extended or adjusted under 35 U.S.C. 154(b) by 560 days.

(21) Appl. No.: 12/646,135

(22) Filed: Dec. 23, 2009

(65) Prior Publication Data
US 2011/0154096 A1 Jun. 23, 2011

(51) Int. Cl.
*G06F 11/00* (2006.01)
(52) U.S. Cl. ............... 714/16; 714/25; 714/48
(58) Field of Classification Search ............ 714/16, 714/25
See application file for complete search history.

(56) References Cited

U.S. PATENT DOCUMENTS

| | | | |
|---|---|---|---|
| 7,590,639 B1 | 9/2009 | Ivanova et al. | |
| 7,594,237 B2 | 9/2009 | Tankov et al. | |
| 2005/0273655 A1* | 12/2005 | Chow et al. | 714/16 |
| 2007/0255773 A1 | 11/2007 | Simeonov et al. | |
| 2007/0255774 A1 | 11/2007 | Topchiyski | |
| 2007/0255775 A1 | 11/2007 | Manolov et al. | |
| 2009/0013216 A1* | 1/2009 | Abrashkevich et al. | 714/46 |
| 2009/0172463 A1 | 7/2009 | Gatev et al. | |
| 2011/0060622 A1* | 3/2011 | Piersol et al. | 705/8 |

* cited by examiner

*Primary Examiner* — Scott Baderman
*Assistant Examiner* — Sarai Butler
(74) *Attorney, Agent, or Firm* — Fish & Richardson P.C.

(57) ABSTRACT

The present disclosure involves systems, software, and computer implemented methods for retrying business methods at an application server after thrown exceptions. One process includes operations for invoking a business method of an enterprise bean hosted in an enterprise bean container. The operations further include determining whether retry conditions are satisfied after an exception is thrown during execution of the business method. The business method is invoked again based on a predefined retry policy when the retry conditions are satisfied.

18 Claims, 3 Drawing Sheets

US 8,381,030 B2

BUSINESS METHODS RETRY OPTIMIZATION

TECHNICAL FIELD

The present disclosure relates to software, computer systems, and computer implemented methods for retrying business methods after thrown exceptions.

BACKGROUND

Application servers may include containers that provide business methods to client applications. The client applications may call multiple business methods provided by the application server during execution of the client applications. In some instances, a called business method may fail due to a thrown exception such as a network shortage, out-of-synch data, concurrent usage, or other errors. Further, the failed business method may be part of a larger business method invocation chain in which a significant portion of the business method invocation chain has already been completed. Thus, the failure of the business method may require the re-execution of the entire business method invocation chain, and the completed portions of the invocation chain would need to be executed again. Still further, the failure of the business method may result in generation of an error report or may require extensive post-processing actions. For example, in some instances, the client application may contain its own retry logic, but the client application retry logic can be complex and error prone. Post-processing retry logic may further require additional resources. In many instances, the failed business method may simply need to be repeated after the initial exception is thrown.

SUMMARY

The present disclosure provides techniques for retrying business methods at an application server after thrown exceptions. A computer program product is encoded on a tangible storage medium, where the product comprises computer readable instructions for causing one or more processors to perform operations. These operations can include invoking a business method of an enterprise bean hosted in an enterprise bean container. The operations further include determining whether retry conditions are satisfied after an exception is thrown during execution of the business method. The business method is invoked again based on a predefined retry policy when the retry conditions are satisfied.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally describes computer systems, software, and computer implemented methods for efficiently retrying failed business methods. Application servers providing containers can receive a call for a business method executed at the application server. In the event that the business method throws an exception, an error report is generated and the business method is aborted. In certain implementations, certain business methods are designated as retriable business methods that can be re-executed if an exception is thrown while the business methods are processed. Depending on the type of exception thrown, a retriable business method can be re-executed in an attempt to complete processing of the business method without providing an error report to the client application that requested the business method or notifying the client application of the failed business method attempt.

One potential benefit of such techniques is that failed business methods can be retried at the application server at the time an exception is thrown. Thus, although a particular exception may have caused abortion of a business method in the first instance, prompt re-execution of the business method at the application server may nonetheless be successful. In this way, the client application does not need to be notified of the error, and the client application's business retry logic or post-processing logic, which in many instances is complex or error prone, can be avoided. Further, if a particular business method is a part of a business method invocation chain that is currently in progress, retrying the business method after an exception is thrown avoids re-executing the entire business method invocation chain and revisiting business methods that have previously been successfully executed. Similarly, in instances where nested business methods are called within a hierarchy of called business methods, only the "inner" business methods need to be retried, which avoids disrupting the "outer" business method chain. Other possible benefits of retrying business methods at the application server include the reuse of a particular bean instance to which the currently executed business method belongs, the avoidance of unnecessary errors in the error log, reducing the number of failed client application requests, and, in the case of a failed retry of a business method, providing detailed information for all business method attempts.

Figure 1:
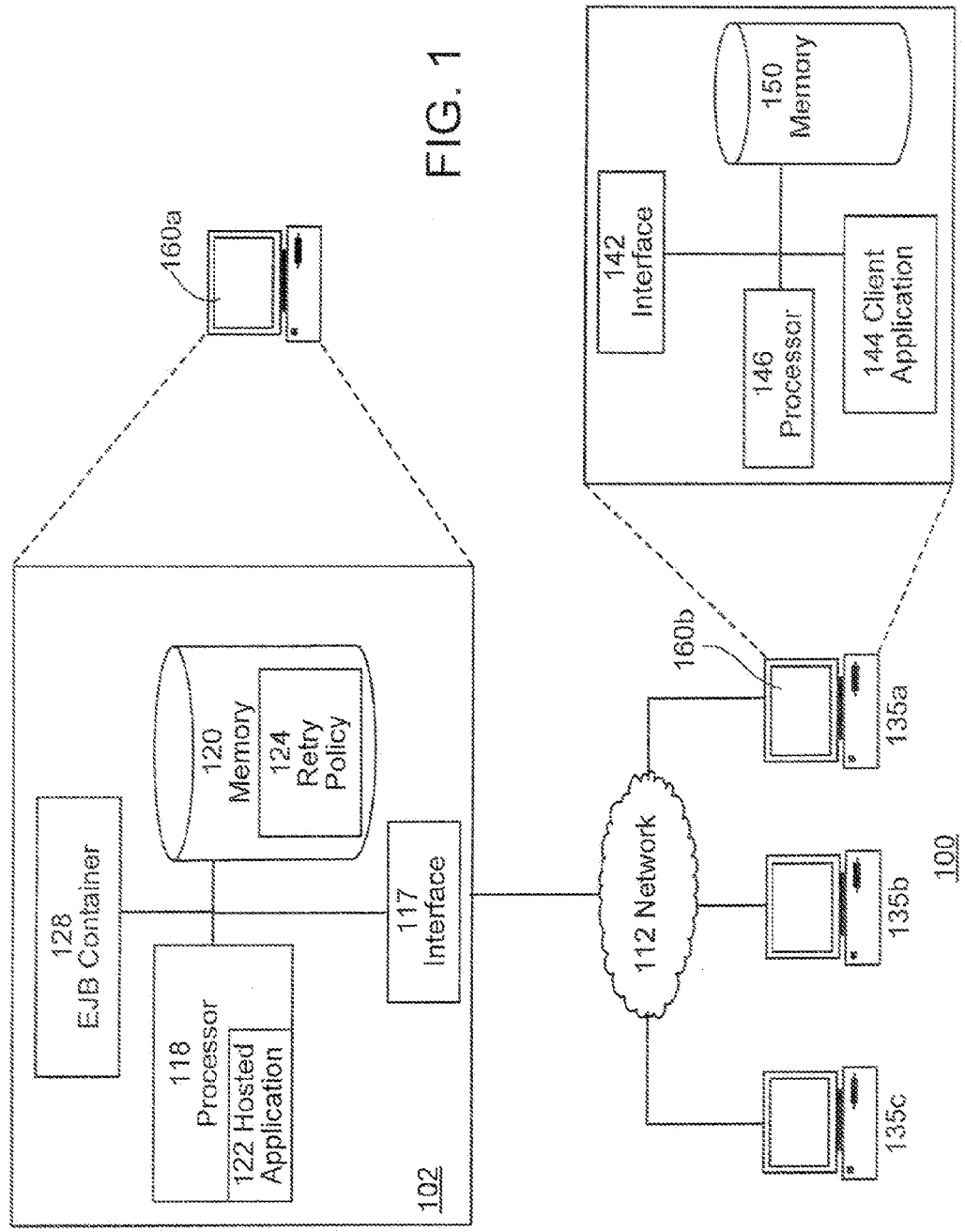
FIG. 1 illustrates an example environment implementing various features for retrying business methods after thrown exceptions.

Turning to the illustrated example, FIG. 1 illustrates an example environment 100 for retrying business methods at an application server. The illustrated environment 100 includes or is communicably coupled with server 102 and one or more clients 135, at least some of which communicate across network 112. In general, environment 100 depicts an example configuration of a system capable of implementing an application server that provides a container in which business methods can be designated as retriable business methods and re-executed after an exception is thrown during execution of the business method during a particular bean instance. The environment 100 also supports a system capable of retrying business methods based on predefined retry conditions and retry policies.

In general, server 102 is any server that stores one or more hosted applications 122, where at least a portion of the hosted applications 122 are executed via requests and responses sent to users or clients within and communicably coupled to the illustrated environment 100 of FIG. 1. For example, server 102 may be a Java 2 Platform, Enterprise Edition (J2EE)-compliant application server that includes Java technologies such as Enterprise JavaBeans (EJB), J2EE Connector Architecture (JCA), Java Message Service (JMS), Java Naming and Directory Interface (JNDI), and Java Database Connectivity (JDBC). In some instances, the server 102 may store a plurality of various hosted applications 122, while in other instances, the server 102 may be a dedicated server meant to store and execute only a single hosted application 122. In some instances, the server 102 may comprise a web server or be communicably coupled with a web server, where the hosted applications 122 represent one or more web-based applications accessed and executed via network 112 by the clients 135 of the system to perform the programmed tasks or operations of the hosted application 122.

At a high level, the server 102 comprises an electronic computing device operable to receive, transmit, process, store, or manage data and information associated with the environment 100. The server 102 illustrated in FIG. 1 can be responsible for receiving application requests from one or more client applications 144 associated with the clients 135 of environment 100 and responding to the received requests by processing said requests in the associated hosted application 122, and sending the appropriate response from the hosted application 122 back to the requesting client application 144. Alternatively, the hosted application 122 at server 102 can be capable of processing and responding to local requests from a user accessing server 102 locally. Accordingly, in addition to requests from the external clients 135 illustrated in FIG. 1, requests associated with the hosted applications 122 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 118, an interface 117, a memory 120, and one or more hosted applications 122. The interface 117 is used by the server 102 for communicating with other systems in a client-server or other distributed environment (including within environment 100) connected to the network 112 (e.g., client 135, as well as other systems communicably coupled to the network 112). Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

The server may also include a user interface, such as a graphical user interface (GUI) 160a. The GUI 160a comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI 160a provides the particular user with an efficient and user-friendly presentation of business data provided by or communicated within the system. The GUI 160a may comprise a plurality of customizable frames or views having interactive fields, pull-down lists, and buttons operated by the user. More generally, GUI 160a may also provide general interactive elements that allow a user to access and utilize various services and functions of application 122. The GUI 160a is often configurable, supports a combination of tables and graphs (bar, line, pie, status dials, etc.), and is able to build real-time portals, where tabs are delineated by key characteristics (e.g. site or micro-site). Therefore, the GUI 160a contemplates any suitable graphical user interface, such as a combination of a generic web browser, intelligent engine, and command line interface (CLI) that processes information in the platform and efficiently presents the results to the user visually.

Generally, example server 102 may be communicably coupled with a network 112 that facilitates wireless or wireline communications between the components of the environment 100 (i.e., between the server 102 and the clients 135), as well as with any other local or remote computer, such as additional clients, servers, or other devices communicably coupled to network 112 but not illustrated in FIG. 1. The network 112 is illustrated as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 102. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure.

As illustrated in FIG. 1, server 102 includes a processor 118. Although illustrated as a single processor 118 in FIG. 1, two or more processors may be used according to particular needs, desires, or particular embodiments of environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of server 102 and, specifically, the one or more plurality of hosted applications 122. Specifically, the server's processor 118 executes the functionality required to receive and respond to requests from the clients 135 and their respective client applications 144, as well as the functionality required to perform the other operations of the hosted application 122.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 118 executes one or more hosted applications 122 on the server 102.

At a high level, each of the one or more hosted applications 122 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 122 may be located at a particular server 102. In others, a plurality of related and/or unrelated hosted applications 122 may be stored at a single server 102, or located across a plurality of other servers 102, as well. In certain cases, environment 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 122 may represent web-based applications accessed and executed by remote clients 135 or client applications 144 via the network 112 (e.g., through the Internet). Further, while illustrated as internal to server 102, one or more processes associated with a particular hosted application 122 may be stored, referenced, or executed remotely. For example, a portion of a particular hosted application 122 may be a web service associated with the application that is remotely called, while another portion of the hosted application 122 may be an interface object or agent bundled for processing at a remote client 135. Moreover, any or all of the hosted applications 122 may be a child or sub-module of another software module or enterprise application (not illustrated) without departing from the scope of this disclosure. Still further, portions of the hosted application 122 may be executed by a user working directly at server 102, as well as remotely at client 135.

In some implementations, server 102 can be a Java 2 Platform, Enterprise Edition (J2EE) application server providing one or more Enterprise JavaBean (EJB) containers 128. The EJB container 128 provides a runtime environment for applications developed using EJB components and manages the enterprise beans contained within it. An enterprise bean can consist of several logically related business methods, and multiple instances of the enterprise bean can be used to simultaneously respond to different client requests. The state of a particular bean can be set to an initial state before processing each new client request. For each enterprise bean, the EJB container 128 can handle all aspects of the enterprise bean's operation within the application server. The services provided by EJB container 128 can include registering the enterprise bean, providing a remote interface for the enterprise bean, creating and destroying enterprise bean instances, checking security for the enterprise bean, managing the active state for the enterprise bean, and coordinating distributed transactions. In certain implementations, the EJB container 128 can also manage all persistent data within the enterprise bean.

In general, the enterprise bean's business methods are executed in the environment managed by the EJB container 128. In some implementations, the EJB container's 128 runtime and metadata model can also include features for allowing failed business methods at the application server 102 to be retried in an efficient manner. A business method that is retriable is associated with a retry policy 124. The retry policy 124 can define the parameters of retrying a particular business method such as the maximum allowed retry attempts for the business method and the interval between retry attempts. The retry policy can also describe when a particular business method should be retried. In some implementations, the timing of retrying a particular business method can depend on the type of exception thrown from the business method or other factors associated with the business method. Business methods can be specifically designated as retriable using Java metadata annotations or Extensible Markup Language (XML). Additional metadata annotations can also be associated with a particular business method such as destination of a business method message and designation of associated server components.

The illustrated environment of FIG. 1 also includes one or more clients 135. Each client 135 may be any computing device operable to connect to or communicate with at least the server 102 and/or via the network 112 using a wireline or wireless connection. Further, as illustrated by client 135a, each client 135 includes a processor 146, an interface 142, a graphical user interface (GUI) 160b, a client application 144, and a memory 150. In general, each client 135 comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes three clients (135a, 135b, and 135c), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 122) or the client 135 itself, including digital data, visual information, the client application 144, or the GUI 160b. Both the input and output device may include fixed or removable storage media such as a magnetic storage media, CD-ROM, or other suitable media to both receive input from and provide output to users of the clients 135 through the display, namely, the GUI 160b.

In general, the server 102 also includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 122. Further, memory 120 may store one or more retry policies 124 for each business method provided by an enterprise bean implemented in the EJB container's 128 environment. Still further, memory 120 may include any other appropriate data, such as VPN applications, firmware logs and policies, HTML files, data classes or object interfaces, unillustrated software applications or sub-systems, firewall policies, a security or access log, print or other reporting files, as well as others.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application at server 102 that can be accessed by client computer 135, in some implementations, server 102 executes a local application that features retriable business methods associated with an enterprise bean implemented in an EJB container 128. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
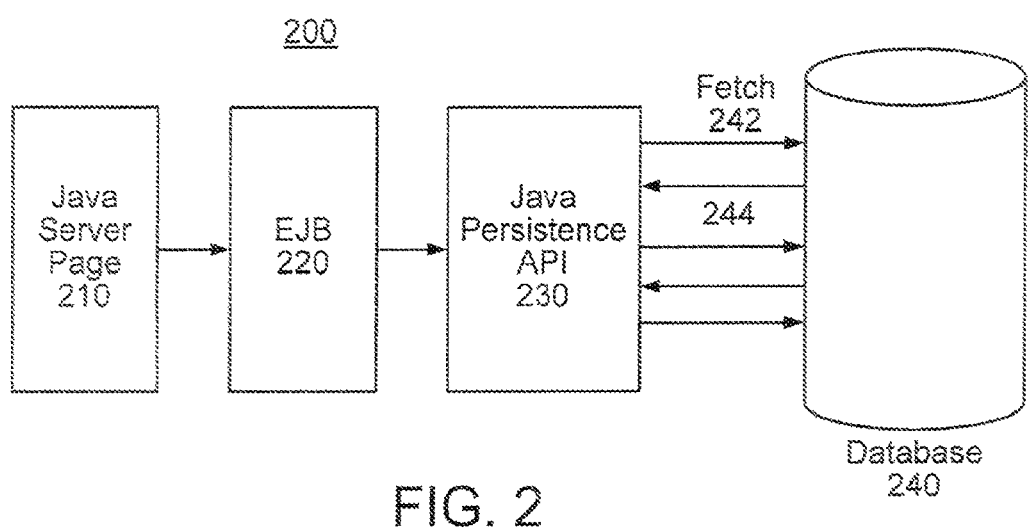
FIG. 2 is diagram of an example scenario in which an exception at a server may be addressed by repeating a request or business method using an appropriate system, such as the system described in FIG. 1.

FIG. 2 is a diagram of an example scenario in which an exception at a server may be addressed by repeating a request or business method. In the example scenario represented in FIG. 2, a client application may initiate a request that is received at a web server. The web server may load a dynamic web page such as JavaServer Page (JSP) 210. A JSP engine may compile the JSP page 210, and, in response to the client request, an enterprise bean 220 operating in an EJB container 128 at an application server 102 may be called to perform some functionality related to the client request. For example, the enterprise bean 220 may be used at the application server 102 to access a relational database 240. To access the relational database 240, the enterprise bean 220 utilizes a Java Persistence API (JPA) 230 to preserve database persistence within the database 240. The Java Persistence API 230 may initiate a fetch command 242 to retrieve entries from the database 240 and update them in accordance with the client request. While the entries from the database 240 are still being processed, however, a concurrent transaction 244 may be initiated against the database 240 before the first transaction 242 has completed processing the data entries fetched from the database 240. In a database management system that employs an optimistic concurrency control scheme, the concurrent transaction 244 is permitted to access the database 240 even if the first transaction 242 is still pending. Thus, if the concurrent transaction 244 finishes processing data entries from the database 240 and commits the changes to the data entries into the database 240 at 246 before the first transaction 242 has committed its changes to the database 240, an optimistic lock exception or concurrent usage exception can be thrown, while the first transaction tries to commit its changes, to preserve the consistency of database 240.

In the optimistic concurrency control implementation, once the concurrent usage exception has been thrown, the first transaction 242 is aborted because the contents of the database 240 have been modified by concurrent transaction 244. In order to successfully complete the processing of the initial client request, the process that initiated the first transaction 242 will now need to be repeated using the updated content of database 240. In some implementations, after the first transaction 242 is aborted, an error report is generated and transmitted to the client application that initiated the request associated with the first transaction 242. The client application may be configured to implement its own optimistic concurrency control. For example, if the client application contains post-processing logic for resolving a failed request, the client application may automatically repeat a failed request after the client application has detected a concurrent usage exception. The client application may be configured to continue repeating the request until a successful response is returned, or the request may be repeated only for a fixed number of attempts.

Alternatively, the business logic for retrying a request after an exception can be implemented at the business method level rather than at the client application level. In the illustrated example, an EJB container 128 may be configured to designate particular business methods as retriable business methods. For example, business methods can be specified as retriable business methods using XML or Java metadata annotations placed above the business method definition in the associated enterprise bean class. Each business method can also be associated with a retry policy that describes specific parameters associated with retrying the business method such as the types of exceptions that are recoverable through retrying the business method that failed due to the exception, the number of times to retry the business method in the event of an exception, the interval between retry attempts, and other parameters associated with retrying business methods. For example, tags representing the attributes of retriable business methods can be included in the method definition in the enterprise bean class associated with the business method. An interval attribute tag can be used to specify the interval at which retry attempts are executed and can be designated using different measurements of time. A maximum attempt attribute tag comprising an integer can be used to indicate the maximum number of attempts that a particular business method will be retried if the newly thrown exception is still an exception from the retry list. In certain implementations, the number of retry attempts and the retry interval attributes are applied to the entire list of throwable exceptions rather than for certain throwable exceptions. Other attributes can also be defined for retriable business methods, such as a retry tag specifying a list of throwable exceptions for which the particular business method will be retried. Further, the EJB container 128 can be configured to provide default retry policies for various scenarios or to allow editing of the retry policies based on the need of the application.

Figure 3:
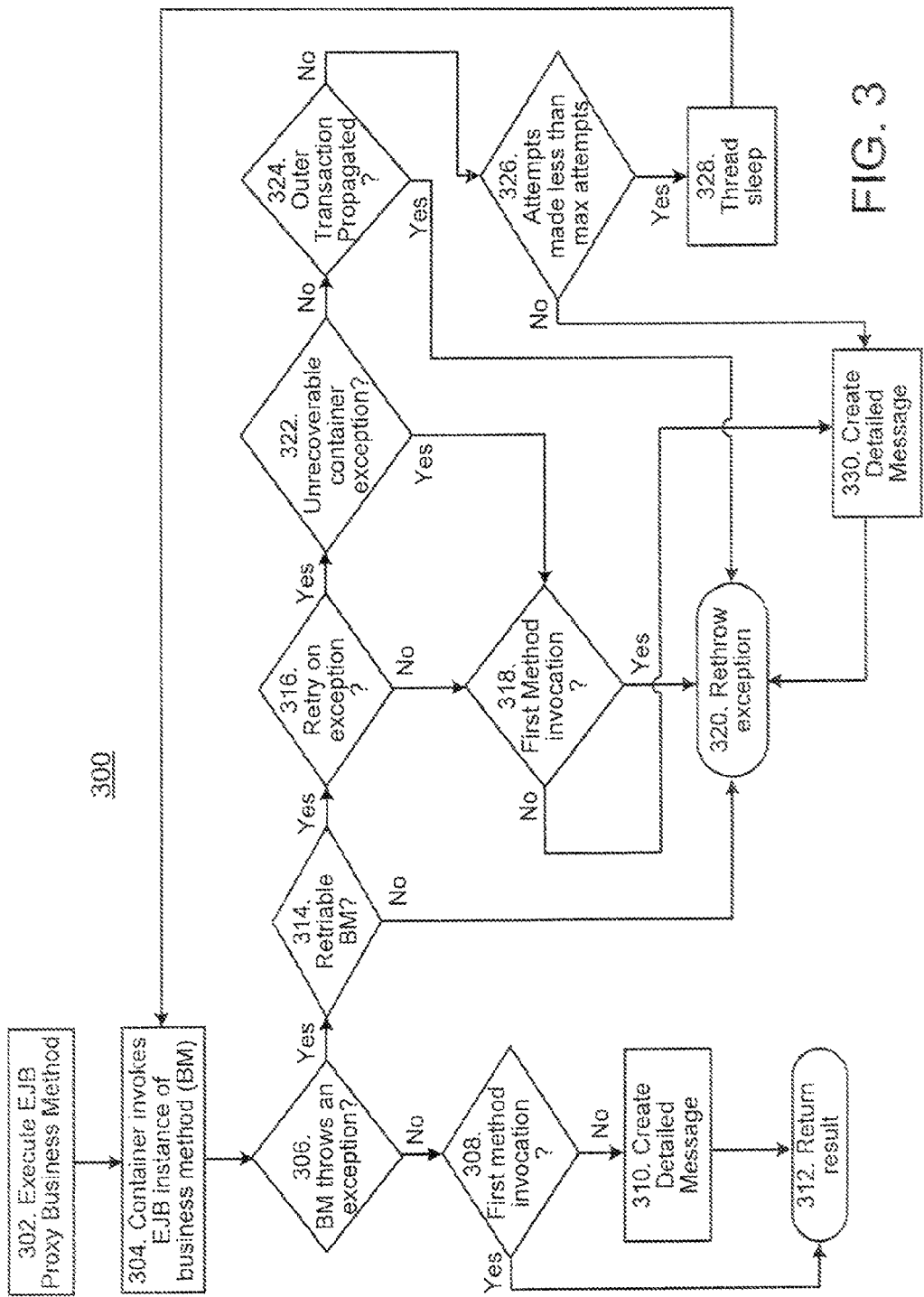
FIG. 3 is a flow chart illustrating an example process of retrying failed business methods using an appropriate system, such as the system described in FIG. 1.

FIG. 3 is a flow chart illustrating an example process of retrying failed business methods. For clarity of presentation, the description of method 300 references environment 100 illustrated in FIG. 1, using example elements that may perform one or more of the described operations. However, it will be understood that method 300 may be performed, for example, by any other suitable system, environment, or combination of systems and environments as appropriate. An EJB proxy business method is initially executed at 302. The EJB container 128 managing the appropriate enterprise bean that is associated with the business method invokes the actual EJB instance of the business method at 304. If the business method throws an exception at 306 before completion of the business method, the EJB container 128 analyzes the situation beginning at 314 to determine the appropriate response to the thrown exception. As illustrated in FIG. 2, the type of thrown exception that may trigger the business logic beginning at 314 for retrying of business methods at the EJB container 128 can be a concurrent usage exception where more than one transaction is simultaneously accessing a database in an optimistic concurrency control environment. Other types of exceptions that may be addressed by retrying the business method can include network shortage or out-of-synch data exceptions or other errors.

At 314, the EJB container 128 determines whether the current business method instance is a retriable business method. Certain business methods of the enterprise bean associated with EJB container 128 may be designated retriable business methods by including metadata annotations or tags above the business method definition in the associated enterprise bean class of the business method. Thus, only certain business methods of the enterprise bean may be designated retriable business methods, and if the present business method has not been marked as a retriable business method, the exception is rethrown at 320. Otherwise, the EJB container 128 proceeds to determine whether the business method will indeed be retried given the exception thrown at 316. There are numerous types of possible exceptions thrown during execution of a business method, and some exceptions do not require a business method to be retried. In some implementations, a list of throwable exceptions for which the particular business method will be retried is defined in the business method's enterprise bean class. If the exception thrown at 306 is not an exception that needs the business method to be retried, the EJB container 128 determines whether the current instance of the business method is the first attempt to invoke the business method of a bean instance currently processing a client request at 318. If it is the first attempt to invoke the business method of the bean instance and no retry attempts have been made, the exception is simply rethrown at 320. If a retry of the business method has already been attempted, a detailed message is created at 330, which can be used to create the exception that is rethrown at 320. The detailed message created at 330 can comprise a report that includes information such as the number of retry errors that have occurred for the current business method execution.

If the thrown exception is indeed an exception requiring re-execution of the business method at 316, the EJB container 128 determines whether the exception is a recoverable exception at 322. In some instances, although the thrown exception is an exception that has previously been identified as capable of being resolved by retrying the current business method, the exception in the present instance may be too serious to be addressed by retrying the business method. If the thrown exception is unrecoverable at 322, the process proceeds to 318 where it is determined whether the current business method is the first attempt at executing the business method without any retry attempts before rethrowing the exception at 320. If execution of the business method has been attempted more than once for a particular instance of an enterprise bean, the exception that will be thrown will contain details about all the retry attempts. If the thrown exception is not unrecoverable, the EJB container 128 determines whether the current business method is part of an invocation chain and whether an outer transaction has been propagated at 324. If the outer transactions have been propagated, the exception is rethrown at 320. If not, the EJB container 128 processes the retry of the business method based on the retry policy included with the business method at 326 and 328.

Each retriable business method can also include a retry policy defined in the method's enterprise bean class. The retry policy can include attributes associated with retrying the particular business method such as the number of retry attempts or the interval between retry attempts. Thus, at 326, the EJB container 128 determines whether the maximum number of retry attempts has been reached or not. If the maximum number of retry attempts has been reached, a detailed message providing information regarding the business method retry process is created at 330 before the exception is rethrown at 320. If the maximum number of retry attempts has not been reached, however, the EJB container 128 waits for an amount of time equal to the designated interval between retry attempts at 328 before retrying the business method again at 304.

Returning to 304 where the EJB container 128 first invokes the current instance of the business method, if an exception is not thrown by the business method at 306, the EJB container 128 determines whether the business method has been invoked for the first time at 308. If the business method has been invoked for the first time, the result of the business method is returned to the client application at 312. If the business method has not been invoked for the first time, a detailed message providing information regarding the number of retry errors is created at 310 before the result is returned at 312.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate. For example, the illustrated examples have been depicted in an EJB container environment, but other applications and environments are also within the scope of the present disclosure.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method for causing one or more processors to retry a business method after a thrown exception, the method comprising the following steps performed by the one or more processors: invoking a business method of an enterprise bean, the enterprise bean hosted in an enterprise bean container; determining whether retry conditions are satisfied after an exception is thrown during execution of the business method; determining whether the thrown exception comprises a recoverable exception, the determination based at least in part on (a) a determination of whether the thrown exception is associated with a previously retriable business method that is incapable of being recovered or (b) on the relative seriousness of the thrown exception and a determined likelihood of recoverability; and invoking the business method again based on a predefined retry policy when the retry conditions are satisfied and the thrown exception is recoverable.

2. The method of claim 1, wherein determining whether the retry conditions are satisfied comprises determining whether the business method has been designated as a retriable business method.

3. The method of claim 1, wherein determining whether the retry conditions are satisfied comprises determining whether the exception is included in a list of exceptions for which the business method will be retried.

4. The method of claim 1, wherein the retry policy includes a number of maximum attempts for invoking the business method.

5. The method of claim 1, wherein the retry policy includes an interval of time between attempts for invoking the business method.

6. The method of claim 1 further comprising generating a report of retry attemnts if the business method has been retried.

7. A computer program product encoded on a non-transitory machine-readable storage medium, the product comprising computer readable instructions for causing one or more processors to perform operations comprising: invoke a business method of an enterprise bean, the enterprise bean hosted in an enterprise bean container; determine whether retry conditions are satisfied after an exception is thrown during execution of the business method; determining whether the thrown exception comprises a recoverable exception, the determination based at least in part on (a) a determination of whether the thrown exception is associated with a previously retriable business method that is incapable of being recovered or (b) on the relative seriousness of the thrown exception and a determined likelihood of recoverability; and invoke the business method again based on a predefined retry policy when the retry conditions are satisfied and the thrown exception is recoverable.

8. The computer program product of claim 7, wherein determining whether the retry conditions are satisfied comprises determining whether the business method has been designated as a retriable business method.

9. The computer program product of claim 7, wherein determining whether the retry conditions are satisfied comprises determining whether the exception is included in a list of exceptions for which the business method will be retried.

10. The computer program product of claim 7, wherein the retry policy includes a number of maximum attempts for invoking the business method.

11. The computer program product of claim 7, wherein the retry policy includes an interval of time between attempts for invoking the business method.

12. The computer program product of claim 7 further comprising generating a report of retry attempts if the business method has been retried.

13. A system, comprising: memory operable to store computer readable instructions defining operations associated with retrying a business method; and one or more processors operable to execute the stored computer readable instructions, the operations associated with retrying the business method comprising: invoking a business method of an enterprise bean, the enterprise bean hosted in an enterprise bean container; determining whether retry conditions are satisfied after an exception is thrown during execution of the business method; determining whether the thrown exception comprises a recoverable exception, the determination based at least in part on (a) a determination of whether the thrown exception is associated with a previously retriable business method that is incapable of being recovered or (b) on the relative seriousness of the thrown exception and a determined likelihood of recoverability; and invoking the business method again based on a predefined retry policy when the retry conditions are satisfied and the thrown exception is recoverable.

14. The system of claim 13, wherein determining whether the retry conditions are satisfied comprises determining whether the business method has been designated as a retriable business method.

15. The system of claim 13, wherein determining whether the retry conditions are satisfied comprises determining whether the exception is included in a list of exceptions for which the business method will be retried.

16. The system of claim 13, wherein the retry policy includes a number of maximum attempts for invoking the business method.

17. The system of claim 13, wherein the retry policy includes an interval of time between attempts for invoking the business method.

18. The system of claim 13, the processors further operable to generate a report of retry attempts if the business method has been retried.

* * * * *